(12) United States Patent
Surcouf et al.

(10) Patent No.: US 10,067,810 B2
(45) Date of Patent: Sep. 4, 2018

(54) PERFORMING TRANSACTIONS BETWEEN APPLICATION CONTAINERS

(71) Applicant: Cisco Technology, Inc., San Jose, CA (US)

(72) Inventors: Andre Jean-Marie Surcouf, St Leu la Foret (FR); Hugo Mike Latapie, Long Beach, CA (US); Enzo Fenoglio, Issy-les-Moulineaux (FR); Joseph T. Friel, Ardmore, PA (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 15/222,890

(22) Filed: Jul. 28, 2016

(65) Prior Publication Data

US 2018/0032383 A1 Feb. 1, 2018

(51) Int. Cl.
*G06F 9/54* (2006.01)
*G06F 21/60* (2013.01)

(52) U.S. Cl.
CPC ............ *G06F 9/546* (2013.01); *G06F 21/602* (2013.01)

(58) Field of Classification Search
CPC ...... G06F 21/60; G06F 21/602; G06F 21/606; G06F 21/6218; H04L 9/00; H04L 9/08; H04L 9/088
See application file for complete search history.

(56) References Cited

U.S. PATENT DOCUMENTS 9,298,806 B1 * 3/2016 Vessenes ................ G06Q 30/00
2011/0191162 A1 * 8/2011 Blackhurst ............. G06Q 20/40
705/14.39

(Continued)

OTHER PUBLICATIONS

"Distributed Ledger Technology: beyond block chain" [Online], Jan. 2016 [Retrieved Apr. 23, 2018], UK Government, Office for Science, Retrieved from: < https://www.gov.uk/government/uploads/system/uploads/attachment data/file/492972/gs-16-1-distributed-ledger-technology.pdf > (Year: 2016).*

(Continued)

*Primary Examiner* — Eric W Shepperd
(74) *Attorney, Agent, or Firm* — Prateek Bhatnagar; Ronald S. Fernando

(57) ABSTRACT

Various implementations disclosed herein provide a method for performing one or more transactions between application containers. In various implementations, the method includes transmitting a key request to a first network node within a cluster of network nodes that are configured to generate and maintain a distributed ledger. In some implementations, the key request indicates that the requested key is for one or more transactions between a first application container and a second application container. In various implementations, the method includes receiving a key in response to transmitting the key request. In some implementations, the key is valid for the one or more transactions between the first application container and the second application container. In various implementations, the method includes synthesizing, at the first application container, transaction data with the key. In various implementations, the method includes transmitting, by the first application container, the transaction data to the second application container.

20 Claims, 7 Drawing Sheets

(56) References Cited

U.S. PATENT DOCUMENTS

| | | | |
|---|---|---|---|
| 2014/0114857 A1* | 4/2014 | Griggs | G06Q 20/20 |
| | | | 705/44 |
| 2016/0254910 A1* | 9/2016 | Finlow-Bates | H04L 9/0891 |
| | | | 713/158 |
| 2016/0321751 A1* | 11/2016 | Creighton, IV | G06Q 40/04 |
| 2017/0078493 A1* | 3/2017 | Melika | H04M 15/48 |
| 2017/0103390 A1* | 4/2017 | Wilson, Jr. | G06Q 20/401 |
| 2017/0140375 A1* | 5/2017 | Kunstel | G06Q 20/40 |
| 2017/0161734 A1* | 6/2017 | Bankston | G06Q 20/3829 |
| 2017/0207917 A1* | 7/2017 | Davis | H04L 9/3066 |
| 2017/0250972 A1* | 8/2017 | Ronda | H04L 9/08 |
| 2017/0287068 A1* | 10/2017 | Nugent | G06Q 20/08 |
| 2017/0357970 A1* | 12/2017 | Muftic | G06Q 20/401 |

OTHER PUBLICATIONS

Hardjono et al. "Anonymous Identities for Permissioned Blockchains" [Online] Jan. 20, 2016 [Retrieved Apr. 23, 2018], MIT, Retrieved from: < http://connection.mit.edu/wp-content/uploads/sites/29/2014/12/Anonymous-Identities-for-Permissioned-Blockchains2.pdf > (Year: 2016).*

* cited by examiner

PERFORMING TRANSACTIONS BETWEEN APPLICATION CONTAINERS

TECHNICAL FIELD

The present disclosure generally relates to application containers, and in particular, to performing transactions between application containers.

BACKGROUND

An application container typically includes an entire runtime environment for an application. The runtime environment for an application generally includes the application and the dependencies of the application. For example, an application container typically includes libraries, binaries, and/or configuration files that are utilized to execute the application. Generally, an application container executes on a physical server or a virtual server. In some scenarios, an application container executes in a cloud computing environment (e.g., in a public cloud or a private cloud). Since an application container typically includes all the resources that the application needs, in some previously available systems, transactions between application containers are tightly controlled.

In some previously available systems, a centralized entity controls the transactions between the application containers. The centralized entity is usually referred to as a clearing house. In some previously available systems, when a first application container determines to initiate a transaction with a second application container, the first application container sends a transaction request to the clearing house. The clearing house determines whether the transaction between the first application container and the second application container is permitted. If the clearing house determines that the requested transaction between the first application container and the second application container is permitted, then the clearing house sends a message to the first application container indicating that the transaction has been approved. The first application container initiates the transaction upon receiving the message from the clearing house.

In some previously available systems, every transaction needs to be approved by the clearing house before the transaction can be completed. For example, if the first application container determines to perform a second transaction with the second application container, the first application container sends a second transaction request to the clearing house. In this example, the first application container performs the second transaction upon receiving a second message from the clearing house indicating that the second transaction has been cleared. In some previously available systems, the clearing house takes a significant amount of time to clear each transaction. Moreover, in some previously available systems, the clearing house charges a fee for clearing each transaction.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
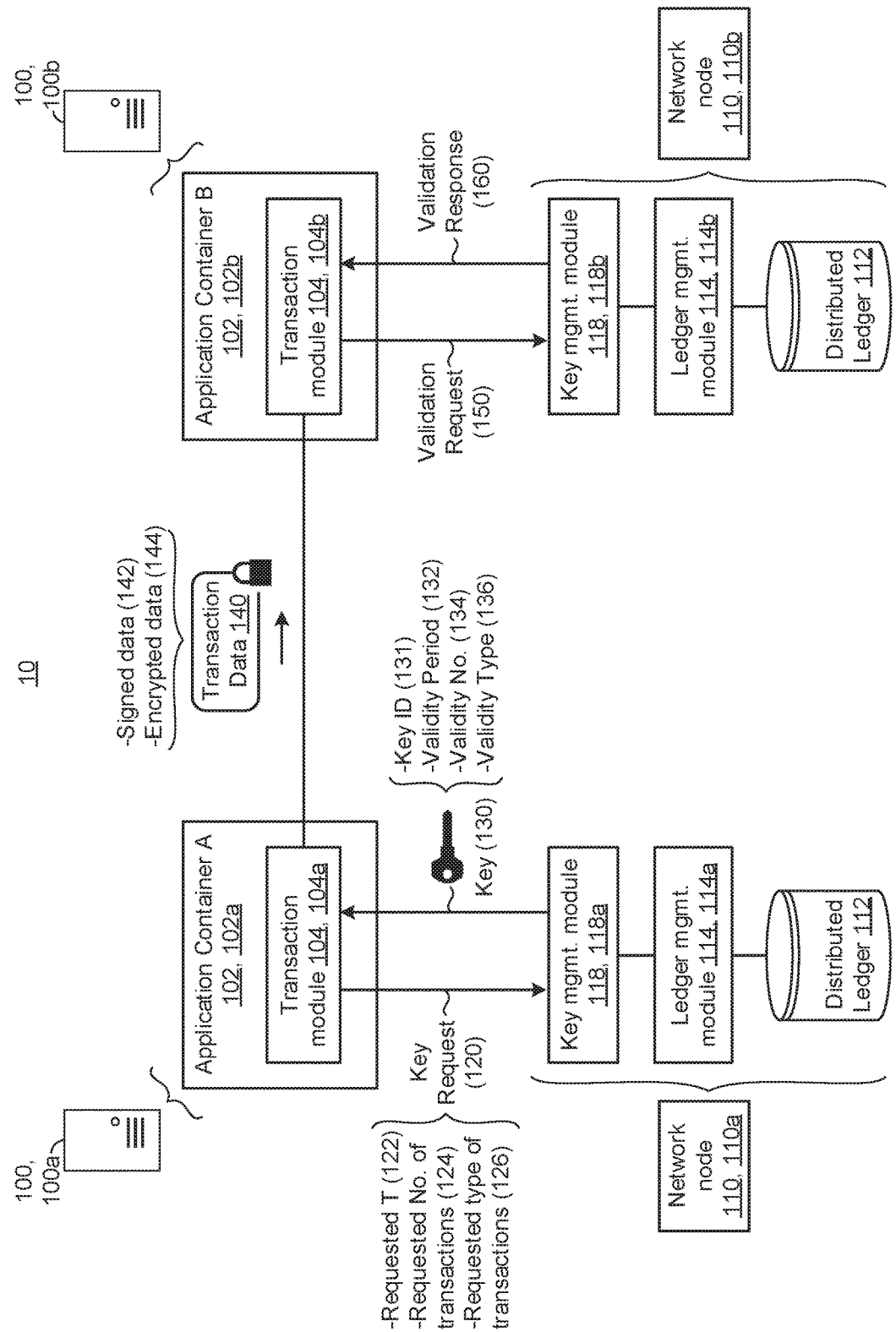
FIG. 1 is a block diagram of a system configured to provide application containers, and maintain a distributed ledger in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.
Overview Various implementations disclosed herein enable synthesizing transaction data at a first application container and transmitting the transaction data to a second application container. For example, in various implementations, a method of synthesizing transaction data is performed by one or more servers that are configured to provide a plurality of application containers. The one or more servers include one or more processors, one or more non-transitory memories and one or more network interfaces. In various implementations, the method includes transmitting a key request to a first network node within a cluster of network nodes that are configured to generate and maintain a distributed ledger. In some implementations, the key request indicates that the requested key is for one or more transactions between a first application container and a second application container. In various implementations, the method includes receiving a key in response to transmitting the key request. In some implementations, the key is valid for the one or more transactions between the first application container and the second application container. In various implementations, the method includes synthesizing, at the first application container, transaction data with the key. In various implementations, the method includes transmitting, by the first application container, the transaction data to the second application container.

FIG. 1 is a block diagram of a system 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the system 10 includes one or more servers 100 (e.g., a first server 100a, a second server 100b, etc.). In some implementations, the servers 100 communicate with each other via a network (not shown). In various implementations, the network includes a public network (e.g., a portion of the Internet, a cellular network, etc.) and/or a private network (e.g., a virtual private network (VPN)). In various implementations, the servers 100 are referred to as physical servers. In some implementations, the servers 100 implement virtual servers. In some implementations, the servers 100 represent a cloud computing environment (e.g., a public cloud or a private cloud).

In operation, the servers 100 provide application containers 102 (e.g., a first application container 102a, a second application container 102b, etc.). In some implementations, the first server 100a implements the first application container 102a, and the second server 100b implements the second application container 102b. Alternatively, in some implementations, the same server 100 (e.g., the first server 100a) implements the first application container 102a and the second application container 102b. In various implementations, an application container 102 includes an entire runtime environment for an application (not shown). In some implementations, the runtime environment for an application includes the application and the dependencies of the application. For example, in some implementations, an application container 102 includes system libraries, system tools, binaries, and/or configuration files that are utilized (e.g., required) to execute the application. In some implementations, an application container 102 includes additional resources that the application utilizes. For example, in some implementations, an application container 102 refers to a virtual machine that is executing on a server 100. In some implementations, an application container 102 refers to a type of workload. Generally, in various implementations, an application container 102 includes hardware resources and software resources that the application utilizes.

In various implementations, an application container 102 includes a transaction module 104 that manages transactions between application containers 102. For example, as exemplified in FIG. 1, the first application container 102a includes a first transaction module 104a, and the second application container 102b includes a second transaction module 104b. In some implementations, the transaction module 104 is associated with (e.g., owns) one or more externally owned accounts that manage the transactions. In some examples, the externally owned account is controlled by a human operator (e.g., a user of the application executing in the application container 102). For example, in some implementations, the human operator has access to a private key that controls the externally owned account.

In various implementations, the system 10 includes a cluster of network nodes 110 (e.g., a first network node 110a, a second network node 110b, etc.). The network nodes 110 are connected via a network (not shown). The network nodes 110 generate and maintain a distributed ledger 112. In some implementations, each network node 110 stores a local copy of the distributed ledger 112. For example, as exemplified in FIG. 1, both the first network node 110a and the second network node 110b store a copy of the distributed ledger 112. In various implementations, the distributed ledger 112 stores (e.g., records) transactions (e.g., all the transactions) between the application containers 102. In some implementations, the distributed ledger 112 stores metadata associated with the application containers 102. For example, the distributed ledger 112 stores information that indicates when the application containers 102 are instantiated.

In various implementations, the distributed ledger 112 stores contract accounts that include programs with computer-executable instructions. In some implementations, the contract accounts are associated with respective contract codes. In some implementations, the contract accounts correspond with respective externally owned accounts. In such implementations, the contract accounts are controlled (e.g., activated) by their corresponding externally owned accounts. As such, in some implementations, the distributed ledger 112 supports externally owned accounts and contract accounts. In various implementations, the distributed ledger 112 refers to a data structure that includes various blocks. In some implementations, each block holds a batch of individual transactions. In some implementations, each block includes a timestamp. In some implementations, a block includes information linking the block to a previous block. For example, in some implementations, a block includes a hash of the previous block. Since the blocks in the distributed ledger 112 are linked to each other, in some implementations, the distributed ledger 112 is referred to as a blockchain.

In various implementations, a network node 110 includes a ledger management module 114, and a key management module 118. For example, the first network node 110a includes a first ledger management module 114a, and a first key management module 118a. Similarly, the second network node 110b includes a second ledger management module 114b, and a second key management module 118b. In various implementations, the ledger management module 114 manages the distributed ledger 112. For example, in some implementations, the ledger management module 114 proposes new blocks for the distributed ledger 112. In some implementations, the ledger management module 114 performs operations to ensure that the network node 110 includes an updated copy of the distributed ledger 112. For example, in some implementations, the first ledger management module 114a performs operations to ensure that the local copy of the distributed ledger 112 stored at the first network node 110a is the same as the local copy of the distributed ledger 112 stored at the second network node 110b. Generally, the ledger management module 114 serves as an interface for the distributed ledger 112. For example, in some implementations, the key management module 118 accesses the distributed ledger 112 via the key management module 118.

In some implementations, the first transaction module 104a determines to initiate a transaction with the second application container 102b. For example, in some implementations, a first externally owned account associated with the first transaction module 104a determines to initiate a transaction with a second externally owned account associated with the second application container 102b. In various implementations, the first transaction module 104a transmits a key request 120 to the first key management module 118a. In some implementations, the key request 120 indicates that the first application container 102a has determined to complete one or more transactions with the second application container 102*b*. In some implementations, the key request 120 indicates a requested time duration 122 during which the one or more transactions are to occur. In some implementations, the key request 120 indicates a requested number of transactions 124 that are to occur between the first application container 102*a* and the second application container 102*b*. In some implementations, the key request 120 indicates a requested transaction type 126 (e.g., smart contract, money transfer, etc.). In various implementations, the key request 120 includes additional information. In some implementations, the key request 120 is for a credential that the first transaction module 104*a* can utilize to perform the transaction(s) with the second application container 102*b*.

In various implementations, the first key management module 118*a* provides a key 130 in response to receiving the key request 120. In some implementations, the first key management module 118*a* determines whether the key request 120 is a valid request. In some implementations, the first key management module 118*a* accesses the distributed ledger 112 to determine whether the key request 120 satisfies one or more validation criterion. In some examples, the first key management module 118*a* queries the distributed ledger 112 to determine whether the first application container 102*a* and the second application container 102*b* are permitted to transact with each other. In some examples, the first key management module 118*a* queries the distributed ledger 112 to determine whether the requested time duration 122, the requested number of transactions 124, and/or the requested transaction type 126 are permitted. Other validation criterion are also contemplated. In some implementations, the first key management module 118*a* queries the distributed ledger 112 to determine whether the second application container 102*b* has indicated its preference for transactions.

In various implementations, the first key management module 118*a* synthesizes the key 130. In some implementations, the key 130 is referred to as a cryptographic key. In some implementations, the key 130 includes a session key. In some implementations, the key 130 includes a pair of keys (e.g., a public key and a private key). In some examples, the pair of keys are asymmetric. Alternatively, in some examples, the key 130 includes a single shared key. A person of ordinary skill in the art will appreciate that the first key management module 118*a* utilizes a variety of techniques to generate the key 130. For example, in some implementations, the first key management module 118*a* utilizes a variety of symmetric-key algorithms, such as Data Encryption Standard (DES) and Advanced Encryption Standard (AES), to generate the key 130. In some implementations, the first key management module 118*a* utilizes a variety of public-key algorithms, such as RSA, to generate the key 130. In some implementations, the key 130 includes a random number. In some implementations, the key 130 is the output of a hash function. In some examples, the key 130 is a hash of the names of the first application container 102*a* and the second application container 102*b*, a time of day, and/or a random number. In some implementations, the key 130 includes a credential (e.g., a username and a password, an ID, etc.). In some implementations, the first key management module 118*s* synthesizes the key 130 by activating a contract account that is associated with an externally owned account owned by the first transaction module 104*a*. For example, the first key management module 118*a* executes instructions associated with the contract account. In some scenarios, the key request 120 includes a contract code for the contract account, and the first key management module 118*a* utilizes the contract code to activate the contract account.

In various implementations, the key 130 is associated with a key identifier (ID) 131 that identifies the key. In various implementations, the key 130 is associated with a validity period 132 that indicates a time duration during which the key 130 is valid. In some implementations, the validity period 132 is equal to the requested time duration 122. However, in some implementations, if the requested time duration 122 is greater than a threshold time duration, then the validity period 132 is limited to the threshold time duration. In various implementations, the key 130 is associated with a validity number 134 that indicates a number of transactions that can be completed with the key 120. In some implementations, the validity number 134 is equal to the requested number of transactions 124. However, in some implementations, if the requested number of transactions 124 is greater than a threshold number of transactions, then the validity number 134 is limited to the threshold number of transactions. In various implementations, the key 130 is associated with a validity type 136 that indicates a transaction type that can be completed with the key 120. In some implementations, the validity type 136 is the same as the requested transaction type 126. However, in some implementations, if the requested transaction type 126 includes transaction types that are not permitted, then the validity type 136 is limited to transaction types that are permitted.

In various implementations, the threshold time duration, the threshold number of transactions, and/or the permitted transaction types are represented by one or more validation criterion stored in the distributed ledger 112. In some implementations, the one or more validation criterion are determined based on a consensus between the network nodes 110. For example, in some implementations, the first network node 110*a* proposes a validation criterion, and the proposed validation criterion is adopted if a majority of the network nodes 110 vote to approve the proposed validation criterion. In this example, if the proposed validation criterion is approved, then the validation criterion is stored in the distributed ledger 112. In some implementations, the first key management module 118*a* stores the key 130 in the distributed ledger 112. In some examples, the key 130 includes a public key and a private key. In such examples, the first key management module 118*a* stores the public key in the distributed ledger 112 and not the private key. The first key management module 118*a* transmits the private key to the first application container 102*a*, and the first application container 102*a* stores the private key in a local key data store.

In various implementations, the first transaction module 104*a* utilizes the key 130 to synthesize the transaction data 140. In some implementations, the transaction data 140 includes signed data 142. In such implementations, the first transaction module 104*a* utilizes the key 130 to generate a digital signature. In some examples, the first transaction module 104*a* signs the transaction data 140 (e.g., a hash of the transaction data) with the key 130. A person of ordinary skill in the art will appreciate that the first transaction module 104*a* utilizes a variety of signing techniques to synthesize the signed data 142. For example, in some implementations, the first transaction module 104*a* utilizes techniques associated with the Digital Signature Algorithm (DSA) and/or Elliptic Curve Digital Signature Algorithm (ECDSA) to synthesize the signed data 142. In some implementations, the transaction data 140 includes encrypted data 144. In such implementations, the first transaction module 104*a* utilizes the key 130 to encrypt the transaction data 140. A person of ordinary skill in the art will appreciate that the first transaction module 104*a* utilizes a variety of encryption techniques to synthesize the encrypted data 144. For example, in some implementations, the first transaction module 104*a* utilizes techniques associated with DES, AES, and/or RSA to synthesize the encrypted data 144. Other signing and/or encrypting techniques are also contemplated. In some implementations, the key 130 includes a credential, and the first transaction module 104*a* includes the credential in a data object (e.g., a JSON object) that represents the transaction data 140. The first transaction module 104*a* transmits the transaction data 140 to the second application container 102*b*.

In various implementations, the second transaction module 104*b* receives the transaction data 140 from the first application container 102*a*, and completes the transaction based on the transaction data 140. In some implementations, the second transaction module 104*b* determines whether the transaction data 140 is valid. In some examples, determining the validity of the transaction data 140 includes determining whether the key 130 utilized to synthesize the transaction data 140 is valid. As such, in various implementations, the second transaction module 104*b* transmits a validation request 150 to the second key management module 118*b*. In some implementations, the validation request 150 includes the key 130 (e.g., when the transaction data 140 includes the key 130). In some implementations, the validation request 150 includes the key ID 131. In some implementations, the validation request 150 includes the transaction data 140.

In various implementations, the second key management module 118*b* receives the validation request 150, and determines whether the key 130 utilized to synthesize the transaction data 140 is valid. In some implementations, the second key management module 118*b* accesses the distributed ledger 112 to determine whether the key 130 is valid. In some examples, the second key management module 118*b* queries the distributed ledger 112 with the key 130 and/or the key ID 131. In various implementations, the second key management module 118*b* transmits a validation response 160 to the second transaction module 104*b*. The validation response 160 indicates a validity status of the key 130. For example, in some implementations, the validation response 160 indicates the validity period 132, the validity number 134, and/or the validity type 136 associated with the key 130.

In various implementations, based on the validation response 160, the second transaction module 104*b* utilizes the transaction data 140 to complete the transaction. In some implementations, the second transaction module 104*b* completes the transaction if the validation response 160 indicates that the transaction data 140 was synthesized with a valid key (e.g., the key 130 is valid). In some implementations, the second transaction module 104*b* completes the transaction if a current time is within the validity period 132 indicated by the validation response 160. In some implementations, the second transaction module 104*b* completes the transaction if a current transaction type associated with the transaction data 140 is the same as the validity type 136 indicated by the validation response 160. In some implementations, the second transaction module 104*b* maintains a transaction counter to indicate the number of transactions that have been completed with the key 130. In such implementations, the second transaction module 104*b* completes the transaction if the transaction counter is less than the validity number 134 indicated by the validation response 160. In these implementations, the second transaction module 104*b* increments the transaction counter upon completing the transaction. In some examples, completing the transaction includes executing a smart contract. In some examples, completing the transaction includes completing a money transfer. In some implementations, the second transaction module 104*b* accesses the distributed ledger 112 to determine whether the transaction is permitted. If the distributed ledger 112 indicates that the transaction is permitted then the second transaction module 104*b* completes the transaction, otherwise the second transaction module 104*b* does not complete the transaction.

In various implementations, the distributed ledger 112 is associated with one or more contract accounts, each contract account includes a set of executable instructions. In some implementations, the transaction data 140 specifies a particular contract account. In such implementations, the executable instructions of the specified contract account are executed according to input parameters indicated by the transaction data 140. Since the distributed ledger 112 stores the transactions as blocks, completing a transaction often includes adding new blocks to the distributed ledger 112. In various implementations, new blocks are verified by each network node 110 in the system 10. As such, in some implementations, the executable instructions of the specified contract account are executed at each network node 110. In various implementations, the executable instructions of the specified contract account are executed in a deterministic manner. For example, the only context for the execution is a position of the new block in the distributed ledger 112 and the transaction data 140. In some implementations, the distributed ledger 112 is associated with numerous contract accounts, so that the application containers 102 can communicate with different contract accounts for different purposes.

In various implementations, an application container 102 and/or a network node 110 synthesizes a digital wallet ("wallet", hereinafter). In some implementations, synthesizing the wallet creates an externally owned account. In some examples, the network nodes 110 receive digital rewards (e.g., digital currency) for maintaining the distributed ledger 112. In some examples, the network nodes 110 receive digital rewards for facilitating transactions. The digital rewards are stored in the wallet. In some implementations, the application containers 102 utilize digital rewards as incentives for the transactions. For example, in some implementations, the transaction data 140 specifies a digital currency amount for completing the transaction.

Figure 2:
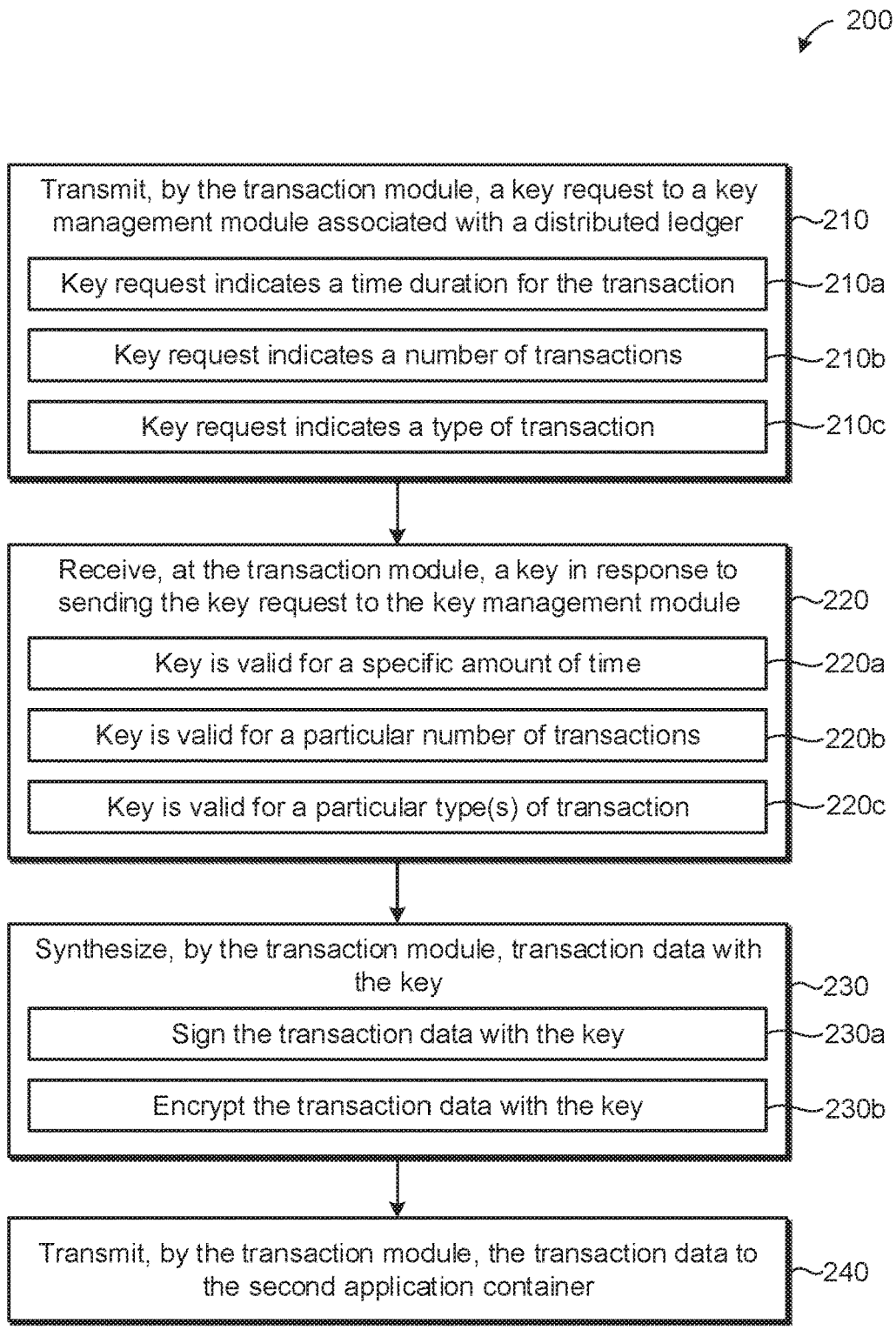
FIG. 2 is a flowchart representation of a method of synthesizing transaction data for a transaction between two application containers in accordance with some implementations.

FIG. 2 is a flowchart representation of a method 200 of synthesizing transaction data for a transaction between two application containers in accordance with some implementations. In various implementations, the method 200 is performed by a transaction module (e.g., the transaction module 104, for example, the first transaction module 104*a* shown in FIG. 1) included in and/or associated with an application container (e.g., the application container 102, for example, the first application container 102*a* shown in FIG. 1). Briefly, the method 200 includes transmitting a key request, receiving a key in response to transmitting the key request, synthesizing transaction data with the key, and transmitting the transaction data.

To that end, as represented by block 210, in some implementations the method 200 includes transmitting a key request to a network node within a cluster of network nodes that are configured to generate and maintain a distributed ledger (e.g., the key request 120 shown in FIG. 1). In some implementations, transmitting the key request includes determining to initiate a transaction between two application containers (e.g., the first application container 102*a* and the second application container 102*b* shown in FIG. 1). In some implementations, the method 200 includes synthesizing the key request upon determining to initiate the transaction. In some implementations, the method 200 includes determining whether a valid key exists for initiating the transaction. In such implementations, if a valid key exists then the method 200 continues to block 230. However, if a valid key does not exist then the method 200 includes synthesizing a key request. In some implementations, synthesizing the key request includes instantiating a data object (e.g., a JSON object), and writing application container identifiers (IDs) for the two application containers to the data object.

In various implementations, transmitting the key request includes transmitting information regarding the transaction(s). For example, as represented by block 210a, in some implementations, transmitting the key request includes transmitting a key request that indicates a time duration for the transaction(s) (e.g., the requested time duration 122 shown in FIG. 1). In some examples, the time duration indicates a time period during which the transaction (s) are expected to occur. As represented by block 210b, in some implementations, transmitting the key request includes transmitting a key request that indicates a number of transactions that are to occur between the application containers (e.g., the requested number of transactions 124 shown in FIG. 1). In some examples, a first application container requests a key that the application container can utilize for a number of transactions. This avoids the need to request a key for each transaction. As represented by block 210c, in some implementations, transmitting the key request includes transmitting a key request that indicates one or more transaction types (e.g., the requested transaction type 126 shown in FIG. 1). Example transaction types include a smart contract, a money transfer, etc. Generally, in various implementations, transmitting the key request includes transmitting, by the transaction module, the key request to a key management module (e.g., the first key management module 118a shown in FIG. 1) associated with a distributed ledger.

As represented by block 220, in various implementations, the method 200 includes receiving a key (e.g., the key 130 shown in FIG. 1) in response to transmitting the key request. In some implementations, receiving the key includes receiving the key from the key management module. In some implementations, receiving the key includes receiving a session key. In some implementations, receiving the key includes receiving a pair of keys (e.g., in implementations associated with public-key cryptography). In some examples, the pair of keys include a public key and a private key. In some implementations, receiving the key includes receiving a single shared key (e.g., in implementations associated with symmetric-key cryptography). In some implementations, receiving the key includes receiving a credential (e.g., a username and a password, an ID, etc.).

In various implementations, the method 200 includes receiving metadata associated with the key. For example, as represented by block 220a, in some implementations, the method 200 includes receiving information that indicates a validity period associated with the key (e.g., the validity period 132 shown in FIG. 1). As represented by block 220b, in some implementations, the method 200 includes receiving a validity number that indicates a number of transactions that can be completed with the key (e.g., the validity number 134 shown in FIG. 1). In various examples, receiving a key that is valid for a number of transactions eliminates the need to request a key for each transaction. As represented by block 220c, in some implementations, the method 200 includes receiving a validity type that indicates the transaction type(s) for which the key is valid (e.g., the validity type 136 shown in FIG. 1).

As represented by block 230, the method 200 includes synthesizing transaction data (e.g., the transaction data 140 shown in FIG. 1) with the key. In some implementations, synthesizing the transaction data includes instantiating a data object (e.g., a JSON object), and writing information regarding the transaction into the data object. As represented by block 230a, in some implementations, synthesizing the transaction data includes signing the transaction data with the key (e.g., synthesizing the signed data 142 shown in FIG. 1). In some examples, signing the transaction data includes signing a portion of the transaction data. In some examples, signing the transaction data includes generating a hash of the transaction data, and generating a digital signature by signing the hash. In some implementations, the key includes a private key and a public key. In such implementations, signing the transaction data includes generating a digital signature with the private key. As represented by block 230b, in some implementations, synthesizing the transaction data includes encrypting the transaction data with the key (e.g., synthesizing the encrypted data 144 shown in FIG. 1). In implementations associated with public-key cryptography, encrypting the transaction data includes encrypting the transaction data with the private key. A person of ordinary skill in the art will recognize that the method 200 utilizes a variety of signing and/or encrypting techniques. In some implementations, the key includes a credential, and synthesizing the transaction data includes writing the credential into a data object that represents the transaction data. As represented by block 240, the method 200 includes transmitting the transaction data to the second application container.

Figure 3:
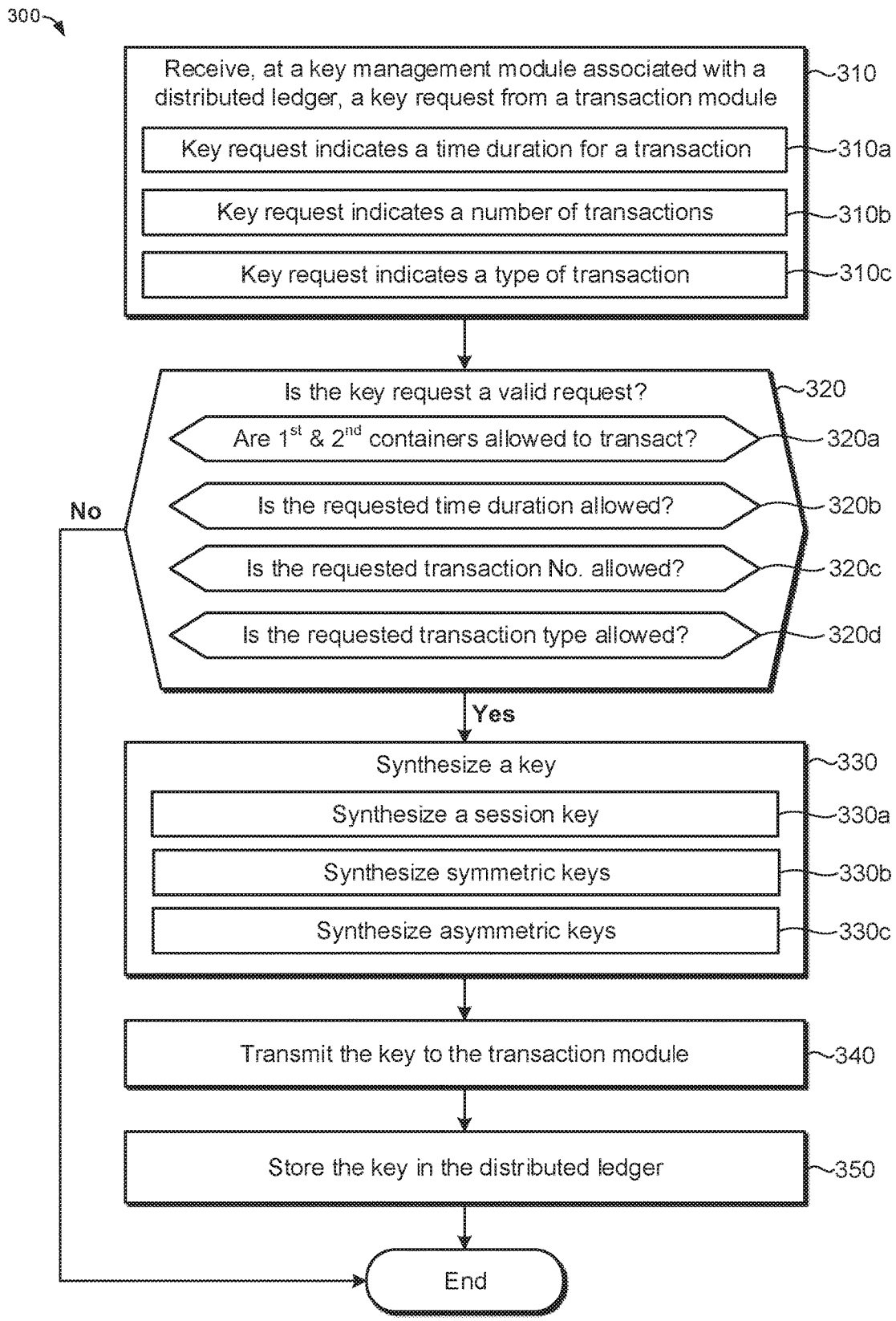
FIG. 3 is a flowchart representation of a method of generating a key that is utilized for synthesizing the transaction data in accordance with some implementations.

FIG. 3 is a flowchart representation of a method 300 of generating a key (e.g., the key 130 shown in FIG. 1) that is utilized for synthesizing transaction data (e.g., the transaction data 140 shown in FIG. 1) in accordance with some implementations. In various implementations, the method 300 is performed by a key management module (e.g., the key management module 118, for example, the first key management module 118a shown in FIG. 1) included in and/or associated with a network node (e.g., the network node 110, for example, the first network node 110a shown in FIG. 1). Briefly, the method 300 includes receiving a key request, determining whether the key request is valid, generating a key, transmitting the key, and storing the key in a distributed ledger.

To that end, as represented by block 310, in some implementations the method 300 includes receiving a key request. In some implementations, the key request is transmitted by a transaction module and received at a key management module. In some implementations, the key request indicates the application containers between which the transaction(s) is (are) to occur. For example, in some examples, the key request includes the application container IDs for the application containers. In some implementations, the key request includes information regarding the transaction(s) that is (are) to occur. For example, as represented by block 310a, in some implementations, the key request includes a time duration for the transaction(s) (e.g., the requested time duration 122 shown in FIG. 1). As represented by block 310b, in some implementations, the key request indicates a number of transactions that are to occur between the application containers (e.g., the requested number of transactions 124 shown in FIG. 1). As represented by block 310c, in some implementations, the key request indicates a transaction type for the transaction(s) that is (are) to occur between the application containers (e.g., the requested transaction type 126 shown in FIG. 1). In some implementations, the method 300 includes receiving a key request that indicates a contract code for a contract account.

As represented by block 320, in various implementations, the method 300 includes determining whether the key request is a valid request. If the key request is a valid request, then the method 300 proceeds to block 330. However, if the key request is not a valid request, then the method 300 ends. In some implementations, the method 300 includes accessing a distributed ledger (e.g., the distributed ledger 112 shown in FIG. 1) and determining whether one or more validation criterion stored in the distributed ledger is satisfied. As represented by block 320*a*, in some implementations, the method 300 includes determining whether the application containers specified in the key request are permitted to transact. In some examples, the method 300 includes determining that the application containers are permitted to transact if the application containers are not on a blacklist that lists application containers that are not allowed to perform transactions. Additionally or alternatively, in some examples, the method 300 includes determining that the application containers are permitted to transact if the application containers are on a whitelist that lists application containers that are allowed to perform transactions. In some implementations, the method 300 includes determining whether a contract code included in the key request is accurate.

As represented by block 320*b*, in some implementations, the method 300 includes determining whether the requested time period specified in the key request satisfies a validation criterion. For example, in some implementations, the method 300 includes determining whether the requested time period is less than a threshold time period that represents a maximum allowed validity period for a key. In such implementations, if the requested time period is less than or equal to the threshold time period, then the method 300 includes determining that the requested time duration is allowed. By contrast, if the requested time period is greater than the threshold time period, then the method 300 includes determining that the requested time duration is not allowed. In some implementations, the method 300 proceeds to block 330 even if the requested time period exceeds the threshold time period. However, in such implementations, the validity period associated with the key is limited to the threshold time period.

As represented by block 320*c*, in some implementations, the method 300 includes determining whether the requested number of transactions specified in the key request satisfies a validation criterion. For example, in some implementations, the method 300 includes determining whether the requested number of transactions is less than a threshold number of transactions that represents a maximum allowed number of transactions for a key. In such implementations, if the requested number of transactions is less than or equal to the threshold number of transactions, then the method 300 includes determining that the requested number of transactions is allowed. By contrast, if the requested number of transactions is greater than the threshold number of transactions, then the method 300 includes determining that the requested number of transactions is not allowed. In some implementations, the method 300 proceeds to block 330 even if the requested number of transactions exceeds the threshold number of transactions. However, in such implementations, the number of transactions associated with the key is limited to the threshold number of transactions.

As represented by block 320*d*, in some implementations, the method 300 includes determining whether the requested transaction type specified in the key request satisfies a validation criterion. For example, in some implementations, the method 300 includes determining whether the requested transaction type is on a list of approved transaction types. In such implementations, if the requested transaction type is on the list of approved transaction types, then the method 300 includes determining that the requested transaction type is allowed. By contrast, if the requested transaction type is not on the list of approved transaction types, then the method 300 includes determining that the requested transaction type is not allowed. In some implementations, the method 300 proceeds to block 330 even if all the requested transaction types are not on the list of approved transaction types. However, in such implementations, the transaction types associated with the key are limited to the requested transaction types that are on the list of approved transaction types.

In some implementations, the method 300 includes accessing a distributed ledger (e.g., the distributed ledger 112 shown in FIG. 1) to determine whether the transacting application container(s) (e.g., the second application container 102*b* shown in FIG. 2) registered with the distributed ledger. If the distributed ledger indicates that the transacting application containers registered with the distributed ledger then the method 300 proceeds to block 330, otherwise the method 300 ends. Generally, the method 300 proceeds to block 330 if the validation criteria are satisfied. However, in some implementations, if the validation criteria are not satisfied, then the method 300 ends.

As represented by block 330, in various implementations, the method 300 includes synthesizing a key (e.g., the key 130 shown in FIG. 1). In various implementations, the key is referred to as a cryptographic key. As represented by block 330*a*, in some implementations, the method 300 includes synthesizing a session key. As represented by block 330*b*, in some implementations, the method 300 includes synthesizing symmetric keys (e.g., by utilizing a variety of symmetric-key algorithms, such as DES and AES). As represented by block 330*c*, in some implementations, the method 300 includes synthesizing a pair of asymmetric keys (e.g., by utilizing a variety of public-key algorithms, such as RSA). In some implementations, the key includes a credential (e.g., a username and a password, an ID, etc.). In such implementations, the method 300 includes retrieving the credential from the distributed ledger or synthesizing the credential. In some implementations, the method 300 includes activating a contract account (e.g., executing computer readable instructions associated with a contract account) to synthesize the key. In some examples, the method 300 includes utilizing a contract code to activate the contract account.

As represented by block 340, in various implementations, the method 300 includes transmitting the key. In some implementations, the method 300 includes transmitting the key to the transaction module. As represented by block 350, in various implementations, the method 300 includes storing the key in the distributed ledger. In some implementations, the method 300 includes storing the public key in the distributed ledger, and storing the private key in a local key data store. In such implementations, since the public key is stored in the distributed ledger, an application container that receives transaction data that has been cryptographically signed with the private key can verify the authenticity of the digital signature by retrieving the public key from the distributed ledger.

Figure 4:
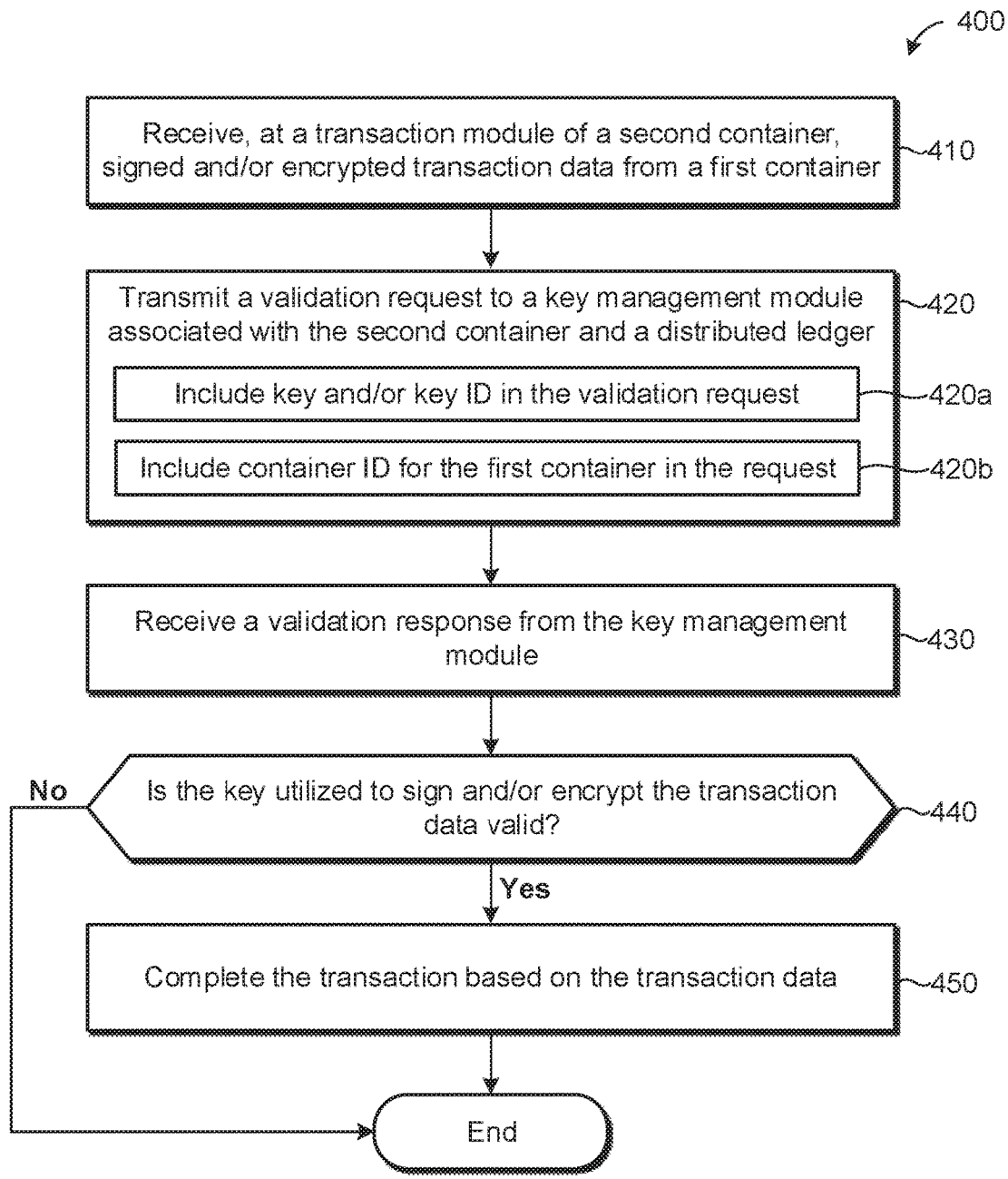
FIG. 4 is a flowchart representation of a method of completing the transaction in accordance with some implementations.

FIG. 4 is a flowchart representation of a method 400 of completing a transaction (e.g., based on the transaction data 140 shown in FIG. 1) in accordance with some implementations. In various implementations, the method 400 is performed by a transaction module (e.g., the transaction module 104, for example, the second transaction module 104b shown in FIG. 1) included in and/or associated with an application container (e.g., the application container 102, for example, the second application container 102b shown in FIG. 1). Briefly, the method 400 includes receiving transaction data, transmitting a validation request, receiving a validation response, determining whether the key utilized to synthesize the transaction data is valid, and completing the transaction if the key is valid.

To that end, as represented by block 410, in some implementations the method 400 includes receiving, at an application container (e.g., the second application container 102b shown in FIG. 1), transaction data from another application container (e.g., the first application container 102a shown in FIG. 1). In some implementations, receiving the transaction data includes receiving signed data and/or encrypted data (e.g., the signed data 142 and/or the encrypted data 144 shown in FIG. 1). In some implementations, the method 400 includes receiving a key that was utilized to synthesize (e.g., sign and/or encrypt) the transaction data. Alternatively or additionally, in some implementations, the method 400 includes receiving a key ID for the key that was utilized to synthesize the transaction data.

As represented by block 420, in various implementations, the method 400 includes transmitting a validation request (e.g., the validation request 150 shown in FIG. 1). In various implementations, transmitting the validation request includes synthesizing the validation request. In some implementations, synthesizing the validation request includes instantiating a data object (e.g., a JSON object), and writing information regarding the transaction data and/or the key utilized to synthesize the transaction data into the data object. For example, as represented by block 420a, in some implementations, the method 400 includes writing the key and/or the key ID into the validation request. Alternatively or additionally, as represented by block 420b, in some implementations, the method 400 includes writing the application container ID of the application container that sent the transaction data into the validation request. In some implementations, the validation request includes the transaction data. In some implementations, the method 400 includes transmitting the validation request to a key management module that is associated with the distributed ledger (e.g., to the second key management module 118b shown in FIG. 1).

As represented by block 430, in various implementations, the method 400 includes receiving a validation response (e.g., the validation response 160 shown in FIG. 1) in response to transmitting the validation request. In some implementations, the method 400 includes receiving the validation response from the key management module. In various implementations, receiving the validation response includes receiving a validity status of the key that was utilized to synthesize the transaction data. For example, in some implementations, receiving the validation response includes receiving a validation period associated with the key (e.g., the validation period 132 shown in FIG. 1). In some implementations, receiving the validation response includes receiving information that indicates a number of transactions for which the key is valid (e.g., the validity number 134 shown in FIG. 1). In some implementations, receiving the validation response includes receiving information that indicates a transaction type for which the key is valid (e.g., the validity type 136 shown in FIG. 1). In some implementations, receiving the validation response includes receiving information that indicates that the transacting application container(s) is (are) registered with the distributed ledger.

As represented by block 440, in various implementations, the method 400 includes determining, based on the validation response, whether the key utilized to synthesize the transaction data is valid. In some implementations, if the key is valid then the method 400 proceeds to block 450, otherwise the method 400 ends. In some implementations, the method 400 includes determining that the key is valid if a current time is within the validity period associated with the key. In some implementations, the method 400 includes determining that the key is valid if a current transaction type associated with the received transaction data matches the validity type associated with the key. In some implementations, the method 400 includes determining that the key is valid if a number of completed transactions is less than the validity number associated with the key. In such implementations, the number of completed transactions refers to the number of transactions that have been previously completed with the key. In other words, the number of completed transactions refers to the number of transactions for which the key was utilized to synthesize the transaction data. As represented by block 450, in various implementations, the method 400 includes completing the transaction upon determining that the key utilized to synthesize the transaction data is valid. In some implementations, if the transaction data is encrypted, completing the transaction includes decrypting the transaction data. In some implementations, if the transaction data is digitally signed, completing the transaction includes verifying the digital signature. In some examples, completing the transaction includes executing a smart contract. In some examples, completing the transaction includes completing a money transfer. In some implementations, the method 400 includes retrieving the key from the distributed ledger.

Figure 5:
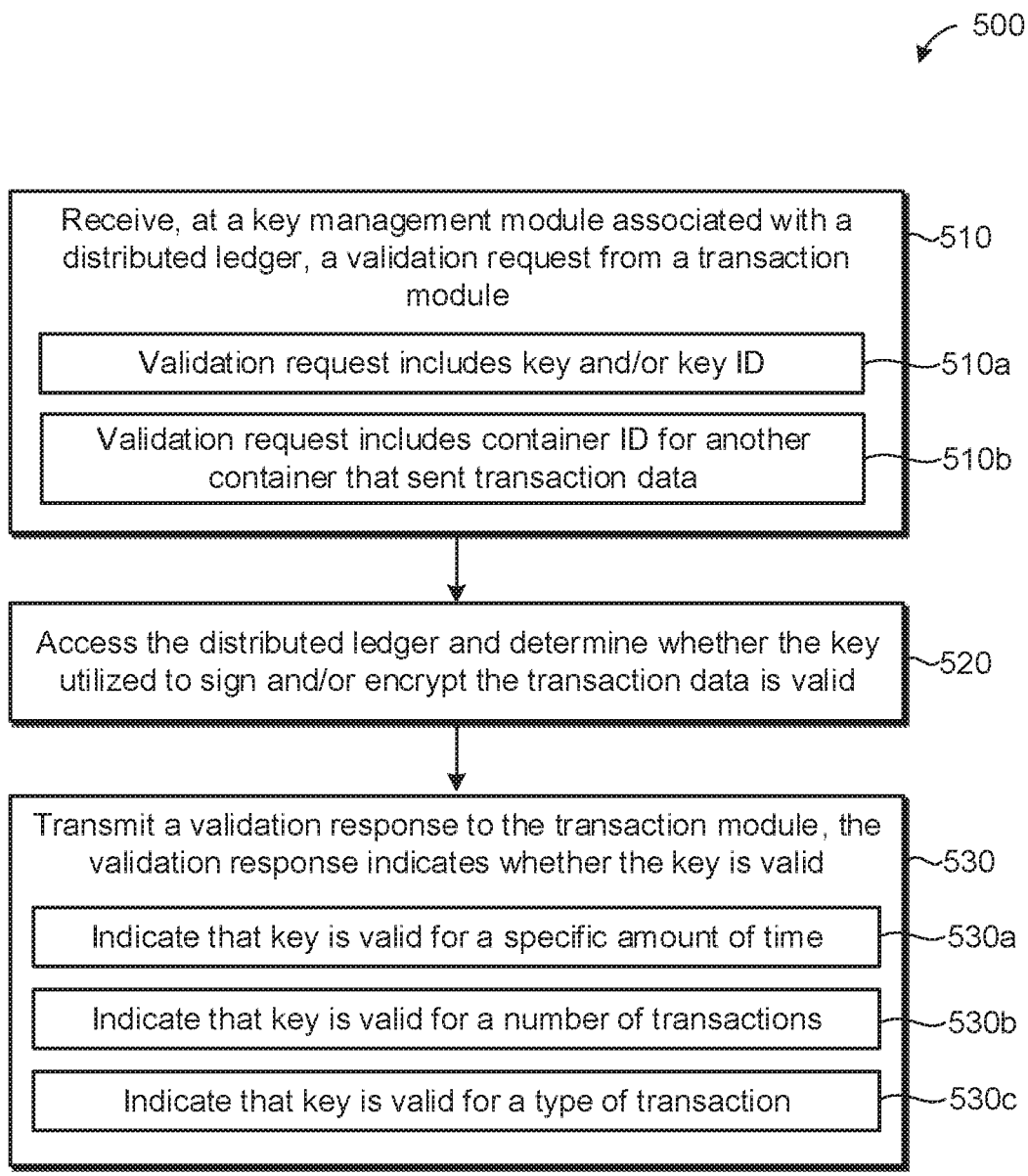
FIG. 5 is a flowchart representation of a method of validating the transaction data in accordance with some implementations.

FIG. 5 is a flowchart representation of a method 500 of validating transaction data (e.g., the transaction data 140 shown in FIG. 1) in accordance with some implementations. In various implementations, the method 500 is performed by a key management module (e.g., the key management module 118, for example, the second key management module 118b shown in FIG. 1) included in and/or associated with an application container (e.g., the application container 102, for example, the second application container 102b shown in FIG. 1). Briefly, the method 500 includes receiving a validation request to validate a key that was utilized to synthesize transaction data, accessing a distributed ledger to determine whether the key is valid, and transmitting a validation response to indicate a validity status of the key.

To that end, as represented by block 510, in some implementations the method 500 includes receiving a validation request (e.g., the validation request 150 shown in FIG. 1). In some implementations, the method 500 includes receiving the validation request from a transaction module (e.g., the transaction module 104, for example, the second transaction module 104b shown in FIG. 1). As represented by block 510a, in some implementations, the validation request includes the key that was utilized to synthesize the transaction data and/or a key ID that identifies the key. Alternatively or additionally, as represented by block 510b, in some implementations, the validation request includes an application container ID that identifies the application container that transmitted the transaction data. In various implementations, the method 500 includes receiving additional information that identifies the key that was utilized to synthesize the transaction data.

As represented by block 520, in various implementations, the method 500 includes accessing a distributed ledger (e.g., the distributed ledger 112 shown in FIG. 1) to determine a validity status of the key. In some implementations, the method 500 includes querying the distributed ledger with the key and/or the key ID. In some implementations, the method 500 includes querying the distributed ledger with the application container ID of the application container that sent the transaction data. In various implementations, the method 500 includes receiving information regarding the validity status of the key from the distributed ledger in response to querying the distributed ledger. In some implementations, the method 500 includes receiving a validity period associated with the key, a validity number associated with the key, and/or a validity type associated with the key (e.g., the validity period 132, the validity number 134, and/or the validity type 136 shown in FIG. 1).

As represented by block 530, in various implementations, the method 500 includes transmitting a validation response (e.g., the validation response 160 shown in FIG. 1). In some implementations, the method 500 includes transmitting the validation response to the transaction module that sent the validation request. In some implementations, transmitting the validation response includes instantiating a data object (e.g., a JSON object), and writing information regarding the validity status of the key to the data object. In various implementations, the validation response indicates the validity status of the key. For example, as represented by block 530a, in some implementations, the validation response indicates that the key is valid for a specific amount of time (e.g., the validity period 132 shown in FIG. 1). As represented by block 530b, in some implementations, the validation response indicates that the key is valid for a number of transactions (e.g., the validity number 134 shown in FIG. 1). As represented by block 530c, in some implementations, the validation response indicates that the key is valid for a type of transaction (e.g., the validity type 136 shown in FIG. 1).

Figure 6:
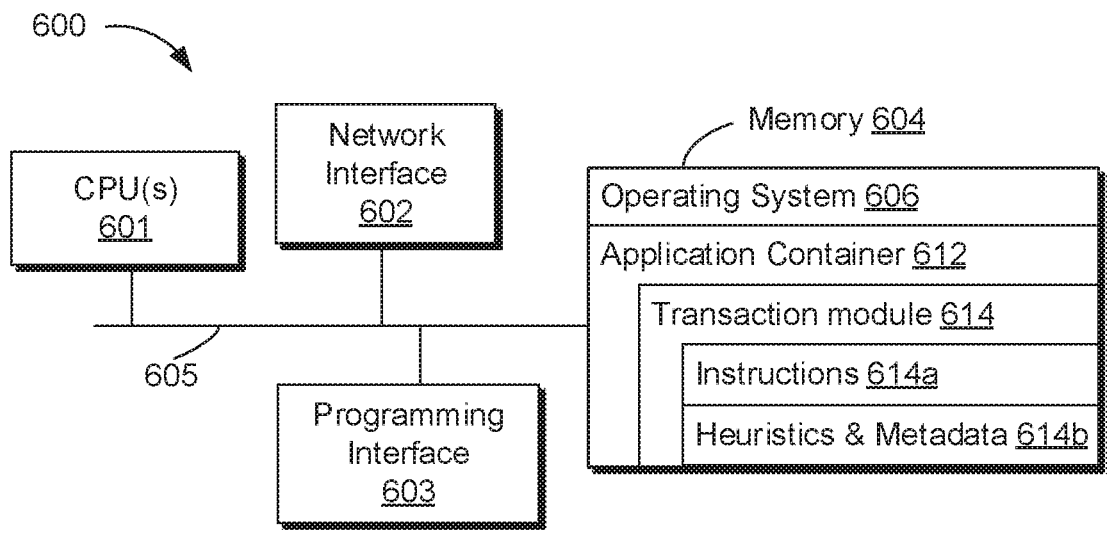
FIG. 6 is a block diagram of a server system enabled with an application container in accordance with some implementations.

FIG. 6 is a block diagram of a server system 600 enabled with an application container 612 (e.g., the application container 102 shown in FIG. 1) according to some implementations. In other words, in some implementations, the server system 600 implements an application container 612. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 600 includes one or more processing units (CPUs) 601, a network interface 602, a programming interface 603, a memory 604 and one or more communication buses 605 for interconnecting these and various other components.

In some implementations, the memory 604 or the non-transitory computer readable storage medium of the memory 604 stores the following programs, modules and data structures, or a subset thereof including an optional operating system 606, and a transaction module 614. In various implementations, the application container 612 and the transaction module 614 are similar to the application container 102 and the transaction module 104, respectively, shown in FIG. 1. Although FIG. 6 only shows one application container 612, in various implementations, the server system 600 supports numerous application containers 612.

The operating system 606 includes procedures for handling various basic system services and for performing hardware dependent tasks.

In some implementations, the transaction module 614 manages transactions between application containers. For example, in some implementations, the transaction module 614 transmits a key request to a network node within a cluster of network nodes that are configured to maintain a distributed ledger. The transaction module 614 receives a key in response to transmitting the key request, and synthesizes transaction data with the key. The transaction module 614 transmits the transaction data to another application container. In some implementations, the transaction module 614 is configured to perform the method 200 shown in FIG. 2. In some implementations, the transaction module 614 receives transaction data, transmits a validation request to determine whether the key utilized to synthesize the transaction data is valid, receives a validation response, and utilizes the transaction data to complete a transaction if the validation response indicates that the key is valid. In some implementations, the transaction module 614 is configured to perform the method 400 shown in FIG. 4. To that end, in various implementations, the transaction module 614 includes instructions and/or logic 614a, and heuristics and metadata 614b.

Figure 7:
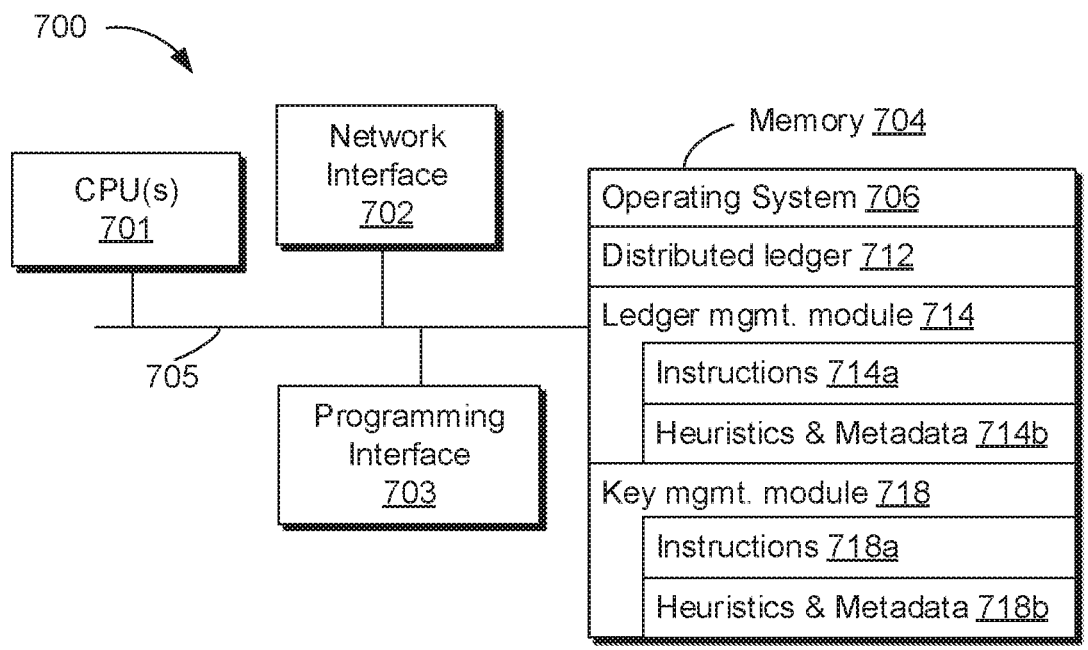
FIG. 7 is a block diagram of a server system enabled with various modules associated with a network node within a cluster of network nodes that are configured to generate and maintain a distributed ledger in accordance with some implementations.

FIG. 7 is a block diagram of a server system 700 enabled with various modules associated with and/or included in a network node (e.g., the network node 110 shown in FIG. 1) according to some implementations. In other words, in some implementations, the server system 700 implements a network node. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 700 includes one or more processing units (CPUs) 701, a network interface 702, a programming interface 703, a memory 704 and one or more communication buses 705 for interconnecting these and various other components.

In some implementations, the memory 704 or the non-transitory computer readable storage medium of the memory 704 stores the following programs, modules and data structures, or a subset thereof including an optional operating system 706, a distributed ledger 712, a ledger management module 714, and a key management module 718. In various implementations, the distributed ledger 712, the ledger management module 714 and the key management module 718 are similar to the distributed ledger 112, the ledger management module 114 and the key management module 118, respectively, shown in FIG. 1.

The operating system 706 includes procedures for handling various basic system services and for performing hardware dependent tasks.

As described herein, the distributed ledger 712 is distributed over various network nodes. In some implementations, each network node stores a local copy of the distributed ledger 712. In some implementations, the distributed ledger 712 stores information regarding transactions between different application containers. In some implementations, the distributed ledger 712 stores a batch of transactions in a block. In some implementations, each block is timestamped. As described herein, in some implementations, the ledger management module 714 manages the distributed ledger 712. For example, in some implementations, the ledger management module 714 ensures that the local copy of the distributed ledger 712 is synchronized with the local copy of the distributed ledger 712 at other network nodes. In some implementations, the ledger management module 714 participates in consensus protocols associated with the distributed ledger 712. For example, in some implementations, the ledger management module 714 proposes new blocks for the distributed ledger 712 and/or votes on block proposals received from other network nodes. To that end, in various implementations, the ledger management module 714 includes instructions and/or logic 714a, and heuristics and metadata 714b.

In some implementations, the key management module 718 receives a key request from an application container, determines whether the key request is valid, synthesizes a key if the key request is valid, transmits the key to the application container, and stores the key in the distributed ledger 712. In some implementations, the key management module 716 determines whether the key request is valid by determining whether one or more validation criterion stored in the distributed ledger 712 is satisfied. In some implementations, the key management module 718 performs the method 300 shown in FIG. 3. In some implementations, the key management module 718 receives a validation request from an application container, accesses the distributed ledger 712 to determine whether the key utilized to synthesize the transaction data is valid, and transmits a validation response that indicates the validity status of the key to the application container. In some implementations, the key management module 718 performs the method 500 shown in FIG. 5. To that end, in various implementations, the key management module 718 includes instructions and/or logic 718a, and heuristics and metadata 718b.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at one or more servers configured to provide a plurality of application containers, the one or more servers including one or more processors, one or more non-transitory memories and one or more network interfaces:
      transmitting a key request to a first network node within a cluster of network nodes that are configured to generate and maintain a distributed ledger, wherein the key request indicates that the requested key is for one or more transactions between a first application container and a second application container;
      receiving a key in response to transmitting the key request, wherein the key is valid for the one or more transactions between the first application container and the second application container;
      synthesizing, at the first application container, transaction data with the key; and
      transmitting, by the first application container, the transaction data to the second application container.

2. The method of claim 1, wherein transmitting the key request comprises determining to initiate a number of transactions; and wherein the key request indicates the number of transactions.

3. The method of claim 2, wherein the key is valid for the number of transactions indicated in the key request.

4. The method of claim 1, wherein transmitting the key request comprises determining a time duration for the one or more transactions; and wherein the key request indicates the time duration.

5. The method of claim 4, wherein the key is valid for the time duration indicated in the key request.

6. The method of claim 1, wherein transmitting the key request comprises determining a transaction type for the one or more transactions; and wherein the key request indicates the transaction type.

7. The method of claim 6, wherein the key is valid for the transaction type indicated by the key request.

8. The method of claim 1, wherein synthesizing the transaction data comprises signing the transaction data with the key.

9. The method of claim 1, wherein synthesizing the transaction data comprises encrypting the transaction data with the key.

10. The method of claim 1, further comprising:
at a key management module associated with the distributed ledger:
receiving the key request from a transaction module associated with the first application container;
determining whether the key request is valid;
generating the key upon determining that the key request is valid; and
transmitting the key to the transaction module.

11. The method of claim 10, wherein determining whether the key request is valid comprises:
accessing the distributed ledger; and
determining, based on a validation criterion stored in the distributed ledger, whether the first application container and the second application container are permitted to complete the one or more transactions.

12. The method of claim 1, further comprising:
at a transaction module associated with the second application container:
receiving the transaction data from the first application container;
transmitting, to a second network node within the cluster of network nodes, a validation request to determine whether the key used to synthesize the transaction data is valid;
receiving, from the second network node, a validation response in response to transmitting the validation request;
determining, based on the validation response, whether the key utilized to synthesize the transaction data is valid; and
completing the one or more transactions upon determining that the key is valid.

13. The method of claim 12, further comprising:
at a key management module associated with the distributed ledger:
receiving the validation request from the transaction module associated with the second application container;
accessing the distributed ledger to determine whether the key is valid; and
transmitting the validation response to the transaction module, wherein the validation response indicates whether the key is valid.

14. A server system comprising:
a transaction module associated with a first application container, wherein the transaction module is configured to:
transmit a key request to a first network node within a cluster of network nodes that are configured to generate and maintain a distributed ledger, wherein the key request indicates that the requested key is for one or more transactions between the first application container and a second application container;
receive a key in response to transmitting the key request, wherein the key is valid for the one or more transactions between the first application container and the second application container;
synthesize transaction data with the key; and
transmit the transaction data to the second application container.

15. The server system of claim 14, wherein synthesizing the transaction data comprises signing the transaction data with the key.

16. The server system of claim 14, wherein synthesizing the transaction data comprises encrypting the transaction data with the key.

17. The server system of claim 14, further comprising:
a key management module associated with the network node, wherein the key management module is configured to:
receive the key request from the transaction module;
determine whether the key request is valid;
generate the key upon determining that the key request is valid; and
transmit the key to the transaction module.

18. The server system of claim 17, wherein determining whether the key request is valid comprises:
accessing the distributed ledger; and
determining, based on a validation criterion stored in the distributed ledger, whether the first application container and the second application container are permitted to complete the one or more transactions.

19. The server system of claim 14, wherein the key is valid for a particular number of transactions between the first application container and the second application container.

20. A device comprising:
a network interface;
a processor; and
a non-transitory memory including computer readable instructions, that when executed by the processor, cause the device to:
transmit a key request to a first network node within a cluster of network nodes that are configured to generate and maintain a distributed ledger, wherein the key request indicates that the requested key is for one or more transactions between a first application container and a second application container;
receive a key in response to transmitting the key request, wherein the key is valid for the one or more transactions between the first application container and the second application container;
synthesize, at the first application container, transaction data with the key; and
transmit, by the first application container, the transaction data to the second application container.

* * * * *